Figure 4:
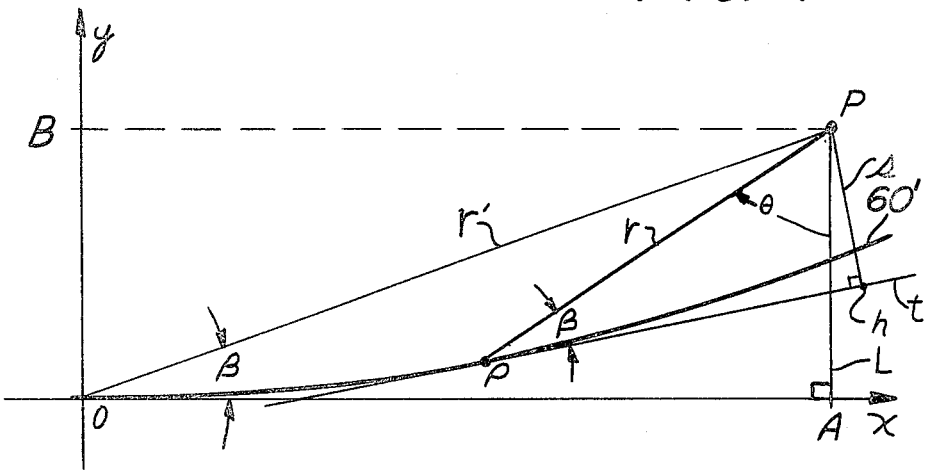

United States Patent [19]

Wesson

[11] 4,214,225
[45] Jul. 22, 1980

[54] SIGNAL TRANSDUCING DEVICE

[75] Inventor: Laurence N. Wesson, Collegeville, Pa.

[73] Assignee: TRW Inc., Cleveland, Ohio

[21] Appl. No.: 972,874

[22] Filed: Dec. 26, 1978

[51] Int. Cl.² ............................................. H01C 10/00
[52] U.S. Cl. ......................................... 338/155; 338/42
[58] Field of Search .................. 338/36, 41, 42, 68, 338/92, 155; 73/719, 725

[56] References Cited

U.S. PATENT DOCUMENTS

| 2,211,493 | 8/1940 | Chappell | 338/155 |
| 2,244,958 | 6/1941 | Moross | 338/155 X |
| 2,316,170 | 4/1943 | Kesselring et al. | 338/155 |
| 2,472,369 | 6/1949 | Davis | 338/155 X |
| 2,915,725 | 12/1959 | Colt et al. | 338/41 |
| 3,030,598 | 4/1962 | Cerny et al. | 338/155 X |

Primary Examiner—C. L. Albritton

Attorney, Agent, or Firm—Jacob Trachtman

[57] ABSTRACT

A signal transducing device comprising a first element having a contact surface with a conductive path, a second element having an arcuate contact surface with an arcuate non circular conductive path and being movable with respect to and engaging by rocking action the contact surface of the first element, the conductive paths of the elements electrically contacting each other at a location which is displaceable along their paths with the movement of the second element. Positioning means retains the elements for relative movement and actuating means moves and positions the second element with respect to the first element and controls the contact location of the elements, while connecting means electrically joins with the conductive paths of the first and second elements for providing an output signal determined by the position of one element with respect to the other.

18 Claims, 7 Drawing Figures

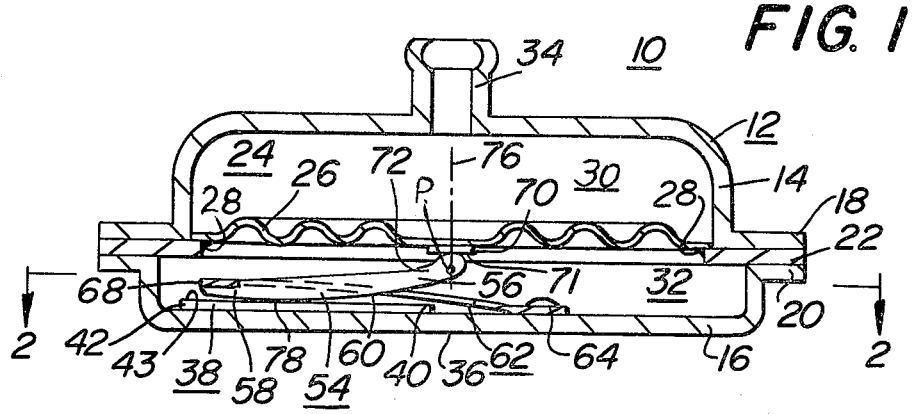
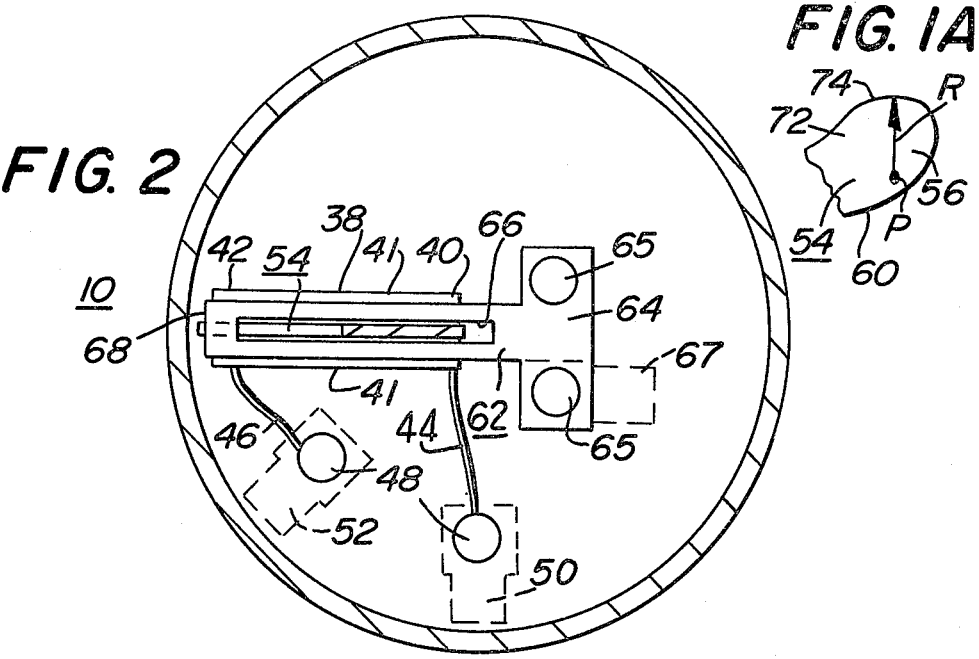
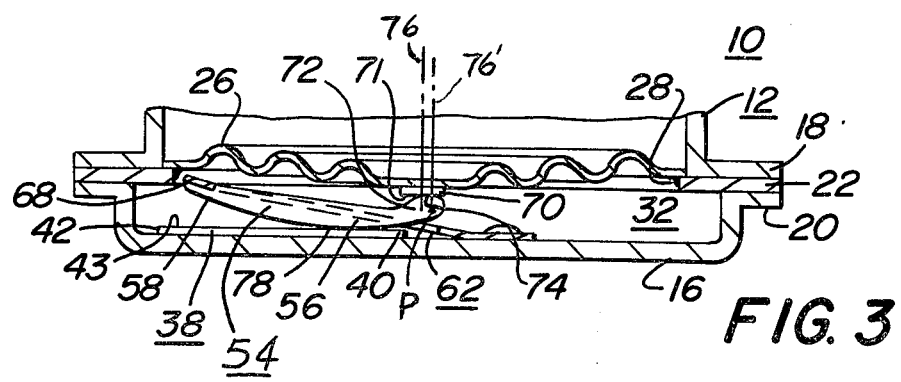

SIGNAL TRANSDUCING DEVICE

The invention relates to a signal transducing device, and more particularly to a device which is mechanically actuated for producing an electrical output signal.

Signal transducing devices have been provided for producing electrical output signals in response to mechanical input signals. Such input signals may be provided by physical displacement, fluid pressure, or other such means which are to be measured or used for control purposes. In many instances, such transducers are required to operate in various positions and altitudes and under rigorous conditions. For many applications it is necessary that they be produced in small and miniature forms for providing highly accurate output signals. The transducers which have heretofore been provided, many have been complex and unreliable, and have not provided the required accuracy when produced in small or miniature configurations.

It is therefore a principal object of this invention to provide a new and improved signal transducing device for providing electrical output signals for input signals in the form of mechanical displacements, fluid pressure, and by other such means.

Another object of the invention is to provide a new and improved signal transducing device which provides highly accurate output signals corresponding in a predetermined manner to the input signals.

Another object of the invention is to provide a new and improved signal transducing device which may be provided in reduced and miniature form for giving accurate output signals in response to the input signals.

Another object of the invention is to provide a new and improved signal transducing device which is operable in any position and under various conditions for providing reliable and accurate output signals.

Another object of the invention is to provide a new and improved signal transducing device of simple construction which is highly reliable in operation.

Another object of the invention is to provide a new and improved signal transducing apparatus which is rugged and may be easily and inexpensively produced.

The above objects as well as many other objects of the invention are achieved by providing a signal transducing device comprising a resistor element and a rocker element which are movable with respect to each other. Each element has first and second ends and a conductive path extending respectively along its element, and they are positioned with their respective ends and paths opposite to each other. The conductive paths of the elements electrically contact each other at a location which is displaceable along the paths of the elements responsive to their relative positions. The rocker element has an arcuate surface providing its conductive path and moves by rocking action of its arcuate surface with respect to the other element for controlling the contact location along the paths of the elements.

An elongated flat spring unit which is slightly bowed extends along the second element and urges the second end of the second element in a predetermined direction with respect to the first element, while urging the first end of the second element in a direction towards the first element. Actuating means controls the position of the second element with respect to the first element by moving the second end of the second element in a direction opposite to the direction in which it is urged by the spring unit. Connecting means are joined electrically with the conductive paths of the first and second element for providing output signals which are determined by the position of one element with respect to the other.

The resistor and rocker elements and the spring unit are received into a hermetically sealed chamber of a housing which is partitioned by a diaphragm to provide another chamber which is adapted for receiving fluid under pressure for deflecting the diaphragm. The diaphragm has a central actuating portion with a flat surface which is movable with deflection of the diaphragm along a line perpendicular to the resistor element to provide an actuating means which engages and positions the rocker element. The resistor element receives a voltage signal across it through the connecting means, while the rocker element which is electrically highly conductive delivers an output signal through the connecting means responsive to its contact location along the resistor element.

Figure 5:
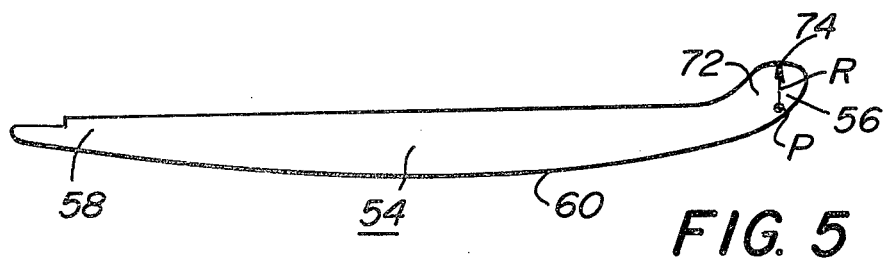
Figure 6:
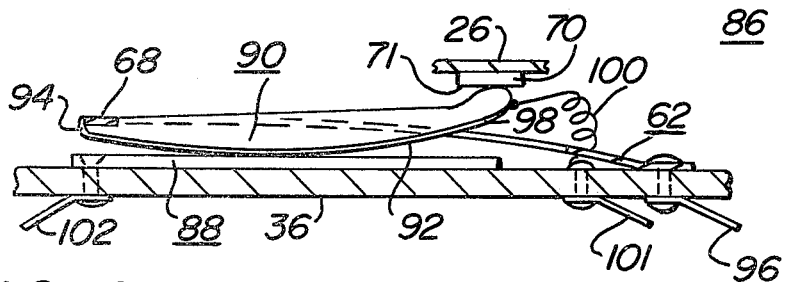

The foregoing and other objects of the invention will become more apparent as the following detailed description of the invention is read in conjunction with the drawing, in which:

FIG. 1 is a sectional view illustrating a signal transducing device embodying the invention, FIG. 1A is an enlarged elevational view with portions broken away, of the actuated upstanding end portion of the rocker element shown in FIG. 1, FIG. 2 is a plan view taken on line 2—2 of FIG. 1, FIG. 3 is a sectional view similar to that of FIG. 1 with the top portion broken away, illustrating the position of the rocker element when the diaphragm is downwardly extended, FIG. 4 graphically illustrates the contour of the curve of the bottom edge of the rocker element which provides a linear displacement of its contact location for each input displacement of the diaphragm, FIG. 5 is an enlarged elevation view of the rocker element of the device of FIG. 1, and FIG. 6 is a sectional view of a portion of a signal transducing device with a modified form of the rocker element shown in the device of FIG. 1.

Like reference numerals designate like parts throughout the several views.

FIGS. 1, 1A, 2, 3, and 5 illustrate a signal transducing device 10 embodying the invention. The transducing device 10 is contained in a housing 12 having upper and lower cup like portions 14 and 16 which may be made of stainless steel. Circular outer flanges 18 and 20 of the top and bottom portions 14 and 16 of the housing 12 are secured, as by welding or other suitable means, on opposite sides of a ring 22 which may also be made of steel to form a cavity 24 within the housing. A flexible diaphragm 26 having a circular outer configuration and an undulating surface may be made of phosphor bronze and secured by welding along its outer edge at 28 to the inner edge of the ring 22. The diaphragm 26 partitions the cavity 24 into an upper chamber 30 and a lower chamber 32. The upper chamber 30 is provided with a central inlet port 34 for receiving fluid under pressure, while the lower chamber 32 may be evacuated and hermetically sealed in a final assembly step.

An elongated resistor element 38 is supported on the top surface of the horizontal bottom wall 36 of the housing 12 with its first inner end 40 positioned close to the wall center and its other end 42 extending radially towards its peripheral margin. The resistor element 38 may be of the wire wound, composition, enamel glaze or other type having a flat top surface 41 with an electrical contact path 43 along a line between its ends. The resistor element 38 provides increasing resistance when measured between one of its ends and a contact location which moves along the path 43 toward its other end. The ends 40 and 42 of the resistor 38 are respectively connected by conductors 44 and 46 to respective conductive rivets 48 which are electrically insulated from and extend through openings in the wall 36 to external electrical terminals 50, and 52. The resistor element 38 and terminals 50, 52 are electrically insulated from the bottom wall 36 by the application of an insulating coating to its inner and outer surfaces and the openings, or in any other suitable manner.

An elongated rocker element 54 having first and second ends 56 and 58 is made of a rigid highly conductive material with an arcuate bottom edge or surface 60 which is non circular in configuration. The rocker element 54 is retained by an elongated flexible metal spring unit 62 so that it is positioned opposite to and along the resistor element 38 with its first and second ends 56, 58 positioned approximately opposite to the first and second ends 40, 42 of the resistor element 38. The bottom surface 60 of the rocker element 58 electrically contacts the resistor element 38 at a location 78 along the line of its path 43 on the flat upper surface of the resistor 38. The contact location 78 is determined by the relative position of the rocker element 54 with respect to the resistor element 38.

The spring unit 62 which may be made of a highly flexible and resilient material has a terminal end 64 which is electrically insulated from and secured by rivets 65 with the inner surface of the bottom wall 36 close to the inner end 40 of the resistor element 38. The terminal end 64 is also electrically connected by a rivet 65 with a signal output terminal 67 which is externally retained by and insulated from the housing 12. The spring unit 62 extends over the inner end 40 of the resistor element 38 and toward its second end 42. The spring unit 62 is also provided with an elongated opening 66 within which the rocker element 54 is received for being retained against lateral displacement. The extending end 68 of the spring unit 62 fits into a notch in the upper edge of the second end 58 of the rocker element 54, and is securely joined with the rocker element 54 by welding, soldering or other such means. The end 68 of the spring unit 62 urges the second end 58 of the rocker element 54 in a downward direction towards the end 42 of the resistor element 38. At the same time, the end 68 of the spring unit 62 also exerts a clockwise torque on the rocker element 54 urging its first end 56 in the clockwise direction. The downward force exerted on the end 58 by the spring unit 62 is of sufficient magnitude with respect to the torque which it applies to the element 54, so that the end 58 is positioned proximate to the second end 42 of the resistor element 38 as shown in FIG. 1 and the end 56 extends upwardly, in the absence of force applied to the rocker element 54 by the downward displacement of the diaphragm 26. In this position, the first end 56 of the rocker element 54 is in contact with the bottom flat surface 71 of an actuating button 70 which is centrally secured to the bottom surface of the diaphragm 26. The button 70 is provided with a plane smooth contacting surface, while the end 56 of the rocker element 54 has an upstanding portion 72 (see also FIG. 1A) with a smooth arcuate contact edge or surface 74.

In operation, when fluid pressure is absent in the upper chamber 30 of the signal transducing device 10, the diaphragm 26 is in a substantially horizontal position as illustrated in FIG. 1. In this case, the spring unit 62 positions the rocker element 54 so that its second end 58 is proximate to the second end 42 of the resistor element 38, while its other first end 56 is displaced upwardly, away from the resistor first end 40, and in contact with surface 71 of the button 70 of the diaphragm 26. With an increase in fluid pressure delivered through the port 34 to the chamber 30, the diaphragm 26 is deflected downwardly resulting in the downward movement of the button 70 along its vertical axis 76. With this movement, the button 70 exerts a downward force on the first end 56 of the rocker element 54 at its point of contact with the arcuate surface 74 of its upright extending portion 72. This provides a rocking motion to the element 54 raising the second end 58 and moving the location 78 of contact between the arcuate surface 60 and the path 43 of the resistor 38 along the linear path 43. The contact location 78 moves in the direction toward the first end 40 of the resistor element 38 and the first end 56 of the rocker body 54. The elongated spring unit 62 which extends along the rocker element 54 with an arcuate configuration and a length corresponding to the length of the arcuate bottom edge 60 of the rocker element 54, is only slightly deflected for readily permitting the rocking movement of the element 54, and minimizes slipping of the rocker contact surface 60 with respect to the surface 41 of the resistor element 38. The rocking action of the element 54 is illustrated by the respective end positions of the rocker body 54 in FIG. 1 for no deflection of the diaphragm 26, and in FIG. 3 for maximum deflection of the diaphragm 26. During such clockwise rocking motion, the rocker body 54 in addition to its angular displacement executes a linear displacement in the direction towards the first end 40 of the resistor element 38. Such movement is clearly evidenced by the displacement of the point P on the end 56 of the rocker element 54 which is on the vertical axis 76 of the button 70 in FIG. 1, and which is displaced to the right in FIG. 3 to lie on the vertical line 76'. The flexing of the slightly bowed configuration of the flexible spring unit 62 allows such lateral translational movement, while the force of the spring unit 62 maintains contact pressure on the element 54 to increase friction and minimize slippage at the contact location with the resistor element 38. The clockwise torque applied by the spring unit 62 at the second end 58 of the rocker element 54 is effective for maintaining such contact pressure even when the downward force applied by the button 70 is minimal as when the diaphragm is in its undeflected position. This torque force also acts to maintain good contact and reliable operation for various orientations or positions of the signal transducing device 10.

Thus, when positioned by the deflection of the diaphragm 26, the rocker element 54 under the action of the spring unit 62, makes contact with the resistor element 38 at a location 78 along the path 43 between its ends 40 and 42. With the application of a voltage between the terminals 50 and 52, a voltage appears across the ends 40, 42 of the resistor element 38, and voltage signals are provided at respective locations along the path 43 between the resistor ends 40, 42 corresponding to the voltage drop produced at these locations. The voltage signal at the contact location is delivered through the conductive rocker element 54 to the end 68 of the spring unit 62, and through the conductive spring 62 and rivet 65 to the external terminal 67. At terminal 67, the voltage signal may be measured with respect to the voltage potential provided at either of the external terminals 50 and 52. In the manner described, an output voltage signal is provided at the output terminals which varies with the displacement of the contact location 78 along the path 43 of the resistor element 38. Since the contact location 78 is a function of the position of the rocker body 54 which is controlled by the deflection of the diaphragm 26, the signal transducing device 10 provides an electrical output signal which is responsive to the deflection of the diaphragm 26 caused by the fluid pressure provided to the upper chamber 30 of the housing 12.

Because of the elongated configuration of the rocker element 54 as clearly seen in FIG. 5, and the extent along which it contacts the path 43 of the resistor 38, the construction of the signal transducing device 10 allows large displacements of the contact location 78 between the elements 38 and 54 for relatively smaller displacements of the button 70. This amplification greatly increases the accuracy with which output signals are provided responsive to small input displacements to the signal transducing device 10. The increased friction provided by the spring unit between the elements 38 and 54 at their electrical contact location, as well as the minimization of frictional force between the smooth flat button 70 and the smooth curved surface 74 at the end 56 of the rocker element 54, also increases the responsiveness of the device 10 and the accuracy of its output signals.

The functional relationship between the output to input signals of the signal transducing device depends upon a number of factors. One of these factors is the relationship between the displacement of the contact location 78 between the elements 38 and 54 to the displacement of the contact button 70 of the diaphargm 26. Another is the variation of resistance along the contact path 43 of the resistor element 38. Thus, if a linear relationship is maintained between the displacement of the contact location 78 with displacement of the button 70, and the resistance varies linearly from one end to the other along the path 43 of the resistor 38, a linear response will be obtained between the input and output signals. Similarly, with other relationships between the components of the device, other desired linear and non linear functions can be achieved.

Thus, the functional relationship between the displacement of the button 70 and the displacement of the contact location 78 of the rocker and resistor element, can be controlled by varying either or both of the contours of the contact edge 60 of the rocker element 54 and the contact path of the resistor element 38. Similarly, the variation in resistance as a function of linear displacement along the contact path of the resistor may also be chosen to control the variation of the output signal. However, if the variation of resistance with displacement is kept constant, the output signal can be made to depend upon the particular contour of the contact surface 60 of the rocker element 54.

Although as noted, the configuration of the arcuate edge or surface 60 may take various forms for providing desirable electrical output signals in response to the input signals of the signal transducing device, the device 10 provides a particular advantage when the surface 60 is provided with an arcuate non circular configuration for contact with the resistor element 38 along a linear line or path 43 to provide highly accurate electrical output signals which are a linear function of the input signals provided by deflection of the actuating button 70 of the diaphragm 26. Such a curve 60' providing the desired properties is graphically illustrated in FIG. 4. The curve 60' represents the contour of the contact surface 60 of the rocker element 58 and is shown in an x, y rectangular coordinate system. The x axis represents the linear path along the resistor element 38 between its ends 40 and 42, and the curve 60' is given by the expression:

$$(x - A)^2 + (y - B)^2 = K^2 e^{\frac{2}{c}[tan^{-1}\left(\frac{y-B}{x-A}\right)]} \qquad (1)$$

where "A" and "B" are the x, y coordinates of a point P(A, B) through which force is applied in a predetermined direction by an actuating means, such as the button 70 of the diaphragm 26, to the end 56 of the rocker element 54 of the device 10. The point P for purposes of illustration is located in FIGS. 1, 1A, 3, and 5 on the first end 56 of the rocker element 54. "K" is a constant of proportionality, and "c" is a constant given by the tangent function (B/A). The curve 60' is tangent to the x axis at the origin, and the angle β is defined as the angle between the tangent line t at any point ρ on the curve 60' and the line from the point ρ to point P. At the origin, the angle β is the angle provided by the x axis and the line r' extending from the origin to the point P, and its measurement is given by the arctangent (B/A).

With the x axis providing the linear contact path on the resistor element 38, the curve 60' in FIG. 6 which contacts the x axis at the origin represents the contact location 78 of the surface 60 as being at the origin. The construction of respective tangent lines t at points along the curve 60' represents the displacement of the contact location 78 along the resistor element 38 with the rocking of the rocker element 54 in the clockwise direction. The curvature of the curve 60' is such that for any point ρ on the curve 60', the measurement of the angle β is equal to a constant, namely the arctangent (B/A). In view of this relationship, it is noted that the construction of a line segment s from the point P perpendicular to the tangent line t intersects the line t at point h providing a right triangle including the angle β at point ρ. Since the measurement of the angle β remains constant, relative displacement of the point P in the direction towards the tangent line t changes the length of the segment s of the triangle proportionally to the change in the length of base of the triangle. This change in the length of the base of the triangle corresponds to a displacement of the location 78, along the resistor element 38. The ratio or proportionality of the respective displacements, is determined by the angle β or the coordinates of the point P. As noted from FIG. 4, the proportional relationship between the displacement of the actuating button 70 and contact location 78 along the resistor path will also be maintained by an actuating force applied through the point P having a component which is perpendicular to the path 43 of the resistor 38.

As also seen from FIG. 1A the delivery of a force through the point P may be achieved by its application to a point on the arcuate surface 74 which is generated by a radius from the point P. When such force is applied by the button 70 of the diaphragm 26, its flat surface 71 will contact the surface 74 at a point of tangency and direct its force in a direction perpendicular to its surface along a radius through the point P. It is noted that the force exerted by the button 70 is in the downward direction along the axis 76 in FIG. 1, and along the axis 76′ in FIG. 3, always being perpendicular to the surface of the resistor element 38. The force exerted, however, as noted above need not be perpendicular to the resistor path 43, but need only provide a perpendicular component through the point P for providing the linear relationship.

The expression for the curve 60′ in rectangular coordinates, may be greatly simplified by its transformation to polar coordinates with the point P as the origin. By such a transformation, the expression for curve 60′ reduces to $$r = K e^{(1/c)\theta}, \qquad (2)$$

where r is the radial distance from the point P to a point ρ on the curve 60′, and θ is the angle measured in the clockwise direction from the vertical line L below the point P.

For providing electrical output signals which are linearly related to the input actuation displacement, the resistance along the resistor element 38 is provided so that it varies linearly with the displacement of the contact point along its path. On the other hand, as already noted, any other functional relationship may be provided between the input signals and the output electrical signals by appropriately varying or modifying the relationship of the resistance change with linear displacement of contact location 78 along the resistor element 38.

FIG. 6 is an enlarged sectional view with portions broken away, showing a signal transducing device 86 having a modified form with respect to the device 10. In this form, the element 88 provides a highly conductive path between its ends, while the rocker element 90 can be made of an insulated material or insulated from a resistive layer or coating 92 applied along its bottom rocker surface for engaging the highly conductive element 88 at various contact locations along its path depending upon the position of the rocker element 90. The resistor path 92 may also be provided by resistance wire windings and other means, and may provide linear or other variations of resistance along the contact path between its ends. One end 94 of the resistor coating 92 is electrically connected with the end 68 of the spring unit 62 for connection with an insulated external terminal 96. The other end 98 of the resistor coating 92 is connected by conductor 100 to a second insulated external terminal 101, while the highly conductive element 88 which is electrically isolated from the wall 36 is also connected to an external terminal 102 for providing the electrical output signals.

Although in the embodiment of the invention illustrated by the signal transducing device 10, the input signal is provided in the form of applied pressure to a deflectable diaphragm, it is noted that the invention is not limited to such means and that the input signals may be provided by other means and may take forms in which other parameters including linear and rotary motions and displacements may be utilized. The apparatus may also be used with more than one input signal, as in the case where differential pressures or forces are to be measured, detected or transformed into electrical output signals while providing the advantages of the invention.

While the invention has been described and illustrated with reference to only a few representative embodiments, or forms, there it will be obvious to those skilled in the art, many modifications and variations accomplishing the foregoing objects and realizing many or all of the advantages, but which yet do not depart essentially from the spirit of the invention.

What is claimed is:

1. A signal transducing device comprising a first element having a contact surface with a conductive path, a second element having an arcuate contact surface with an arcuate non circular conductive path and being movable with respect to and engaging by rocking action the contact surface of the first element, the conductive paths of the elements electrically contacting each other at a location which is displaceable along their paths with the movement of the second element, positioning means for retaining the elements for relative movement, actuating means for moving and positioning the second element with respect to the first element and controlling the contact location of the elements, the actuating means engaging the second element and being displaceable in a predetermined direction for moving the second element, the displacement in the predetermined direction of the actuating means having a linear relationship to the displacement of the contact location along the paths of the elements, and connecting means electrically joined with the conductive paths of the first and second elements for providing an output signal determined by the position of one element with respect to the other.

2. The device of claim 1 in which the ratio of conductance to length of displacements along each of the paths of the elements is a respective constant.

3. The device of claim 1 in which the first and second elements each have first and second ends, are each elongated and have their paths extending respectively along their elements with their respective first and second ends and paths opposite to each other.

4. The device of claim 3 in which the actuating means engages the first end of the second element for rocking movement of the second element.

5. The device of claim 4 in which the conductive path of the first element is linear in configuration and provided by a flat surface, and the curvature of the non circular conductive path of the second element is represented in an x, y rectangular coordinate system by the equation $$(x - A)^2 + (y - B)^2 = K^2 e^{\frac{2}{c}\left[\tan^{-1}\left(\frac{y-B}{x-A}\right)\right]}$$

where "A" and "B" are the coordinates of a point P(A, B) through which a force in the predetermined direction is applied by the actuating means to the second element to provide the rocking movement, "K" is a proportionality constant, and "c" is a constant given by the tangent function of (B/A).

6. The device of claim 5 in which the ratio of conductance to length of any displacement along each of the paths of the elements is a respective constant.

7. A signal transducing device comprising a first element having a contact surface with a conductive path, a second element having an arcuate contact surface with an arcuate non circular conductive path and being movable with respect to and engaging by rocking action the contact surface of the first element, the first and second elements each having first and second ends, each being elongated and having their paths extending respectively along their elements with their respective first and second ends and paths opposite to each other, the conductive paths of the elements electrically contacting each other at a location which is displaceable along their paths with the movement of the second element, positioning means for retaining the elements for relative movement, actuating means for moving and positioning the second element with respect to the first element and controlling the contact location of the elements, the actuating means being displaceable in a predetermined direction and engaging the first end of the second element for rocking movement of the second element, the displacement of the actuating means in the predetermined direction having a linear relationship to the displacement of the electrical contact location along the conductive paths of the elements, the conductive path of the first element being linear in configuration and provided by a flat surface, and the curvature of the non circular conductive path of the second element being represented in an x, y rectangular coordinate system by the equation $$(x - A)^2 + (y - B)^2 = K^2 e^{\frac{2}{c} [tan^{-1}(\frac{y-B}{x-A})]}$$

where "A" and "B" are the coordinates of a point P(A, B) through which a force in the predetermined direction is applied by the actuating means to the second element to provide the rocking movement, "K" is a proportionality constant, and "c" is a constant given by the tangent function of (B/A), and the actuating means engages the first end of the second element at a contact surface generated by points which are equidistant from the points P(A,B).

8. The device of claim 7 in which the ratio of conductance to length of any displacement along each of the paths of the elements is a respective constant.

9. The device of claim 8 in which the actuating means moves in a direction perpendicular to the conductive path of the first element for rocking the second element.

10. The device of claim 9 in which the first end of the second element has an upstanding portion for providing the contact surface for the actuating means.

11. The device of claim 10 in which the positioning means includes a spring unit having a first end fixed with respect to the first element and a second end urging the second end of the second element in a direction which opposes the movement of the second element resulting from the displacement of the actuating means in the perpendicular direction toward the first element.

12. The device of claim 11 in which the second element is a thin flat body, and the spring unit is provided with an elongated opening receiving within it the second element for retention against transverse movement and the spring unit has an effective length corresponding to the length of the path provided by the arcuate surface of the second element for minimizing slipping with respect to the first element during its rocking movement.

13. The device of claim 12 which includes a support structure to which the first element is secured, the support structure provides a housing having a cavity partitioned by a diaphragm member into first and second chambers, the first chamber is adapted for receiving fluid under pressure for deflecting the diaphragm, the second chamber is hermetically sealed and receives the first and second elements and the spring unit, and the diaphragm has a flat actuating portion movable with the deflection of the diaphragm along a line perpendicular to the flat surface of the first element providing the actuating means for engaging the upstanding portion of the second element.

14. The device of claim 1, 2, or 3 in which the conductive path of the first element has a linear configuration.

15. The device of claim 1, 2, or 3 in which the conductive path of the first element has a linear configuration, the path of the first element is electrically resistive, and the path of the second element is electrically highly conductive.

16. The device of claim 1, 2, or 3 in which the conductive path of the first element has a linear configuration, the path of the first element is electrically highly conductive, and the path of the second conductive element is electrically resistive.

17. The device of claim 1, 2, 3, 6, 7, 9, or 13 in which the path of the first element is electrically resistive and the path of the second element is electrically highly conductive.

18. The device of claim 1, 2, 3, 6, 7, 9, or 13 in which the path of the first element is electrically highly conductive, and the path of the second element is electrically resistive.

* * * * *